United States Patent Office 3,333,922
Patented Aug. 1, 1967

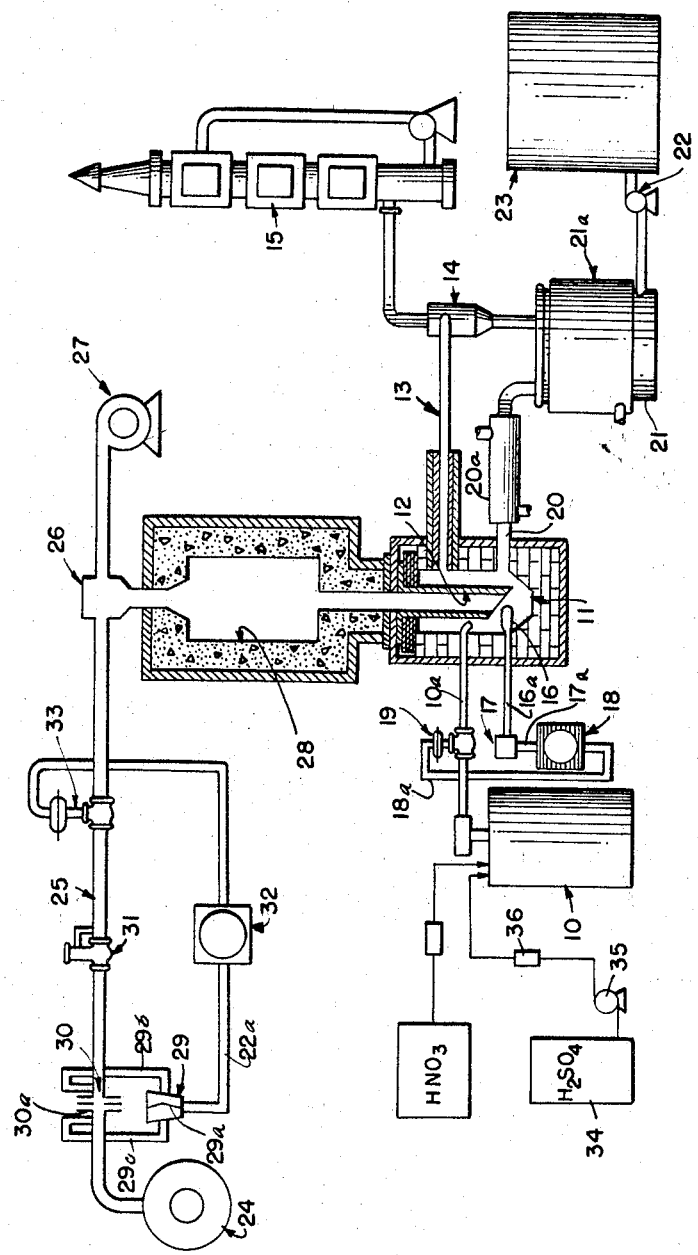

3,333,922
ULTRANITROPHOSPHORIC AND ULTRANITROSULFOPHOSPHORIC ACIDS AND PROCESS FOR PRODUCING SAME
Ernest Csendes, Atlanta, Ga., and William R. Mustian, Jr., Lakeland, Fla., assignors to Armour and Company, Chicago, Ill., a corporation of Delaware
Filed July 16, 1963, Ser. No. 295,426
7 Claims. (Cl. 23—139)

This invention relates to ultranitrophosphoric acids and ultranitrosulfophosphoric acids having a phosphorus content of from about 78 weight percent (expressed as $P_2O_5$ equivalent on an impurity-free basis) to a weight percent up to about 100% as $P_2O_5$ equivalent on an impurity-free basis, said acids being liquid at ambient or room temperatures.

The importance of wet process high phosphorus content acids has been recognized by the phosphate industry for many years, but the workers in the field have warned against an increase in concentration on the ground that the product would become highly viscous and would be solid at ambient temperatures. The formation of metaphosphoric acid, which is undesirable for many reasons, was further set out as an objection to the production of a wet process phosphoric acid having a concentration beyond the previously-accepted concentrations.

A further difficulty has had to do with an increase in citrate insoluble fractions of the phosphoric acid as the phosphoric acid is increased in $P_2O_5$ values. Particularly where the ortho acid is converted into polyphosphoric acid and the $P_2O_5$ equivalent is substantially raised, there is a tendency for a substantial portion of the phosphonic acid to become citrate insoluble and therefore unsatisfactory from the fertilizer standpoint.

The term "superphosphoric acid," which is generally referred to as "SPA," has been applied to wet process phosphoric acids having a weight percent of about 70 to about 80, expressed as $P_2O_5$ equivalent on an impurity-free basis. Wet process acids above about 80 weight percent and, more specifically, about 83 weight percent and above, are designated "ultraphosphoric acids" (referred to herein as "UPA"). Unfortunately, neither of the foregoing acids (SPA or UPA) has the desired green color sought after for fertilizer products, and, as stated above, some portion of the products are citrate insoluble.

We have discovered that by the addition of small amounts of nitrogen to the phosphoric acid feed undergoing dehydration, there is brought about an oxidation of certain reduced species of phosphorus compounds which are citrate insoluble, and that as a result, a substantial portion of the concentrated acid product which was formerly citrate insoluble now becomes citrate soluble. Further, the treatment results in a phosphoric acid product having an improved color. The nitrogen addition may be made in the form of nitric acid or in the form of ammonium nitrate, or sodium nitrate, or aluminum nitrate, or ferrous nitrate, or ferric nitrate, or zinc nitrate. We prefer to add the nitrogen in the form of nitric acid.

We have further discovered that by adding $SO_3$ together with the nitric acid to the feed phosphoric acids, a very substantial reduction in the temperature required for converting the acid to a high $P_2O_5$ is produced and the employment of low temperatures further aids in reducing the citrate insoluble components. The addition of both nitric and sulphuric acids to the feed undergoing dehydration results in a product having the desired green color.

We have now produced ultranitrophosphoric acids and ultranitrosulfophosphoric acids which remain liquid from a weight percent of about 78 to about 100 expressed as $P_2O_5$ equivalent on an impurity-free basis, the resulting acid compositions having important new and surprising properties.

In the process, N is preferably added as $HNO_3$ to the wet process phosphoric acid, and it is found that relatively small amounts are sufficient to bring about the results above described. For example, from about 0.9 to 3% of $HNO_3$, which equals 0.2 to 0.7% N, is effective in breaking up the long chains and reducing the citrate insolubles while producing an improved color. It was surprising to find that the organic substances which are always present as impurities in the wet process phosphoric acid of commerce, react to form a product of oxidation which is evolved from the product acid as a gas. The reaction which occurs may be represented in its simplest form by

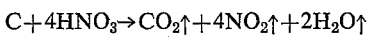

The color clarification of the product is far superior to wet process phosphoric acid containing 27–64% $P_2O_5$ (on an impurity-free basis) from which the organic material has been removed by calcination. A further surprising result, as stated above, is that certain water and citrate insoluble forms of reduced phosphorus species (e.g., $P_2O_3$) are raised to higher oxidation levels and rendered soluble by reactions for which the following is typical:

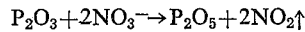

In preparing the new ultranitrosulfophosphoric acids, the addition of the $SO_3$ to the wet process acid has been found to reduce very substantially the temperatures required for converting the acid into the final high $P_2O_5$ value product, and this reaction has also an important bearing on the reduction of citrate insolubles. In some instances, the temperature requirement for conversion of the wet process acid to an ultraphosphoric acid of a selected weight percent is lower by as much as 100° F. when $SO_3$ is added to the wet process acid. Finally, the addition of the $SO_3$ to the wet process acid undergoing dehydration has resulted in an increased conversion of the ortho phosphoric acid to the ultraphosphoric acids. While the invention is particularly useful in the treatment of wet process phosphoric acids, it will be understood that the process is also applicable to all phosphoric acids of commerce, however produced.

From the foregoing, it will be seen that the present invention contemplates the use of a nitrogen compound either alone or in combination with sulphuric acid, both processes being effective in the lowering of citrate insolubles and in the case of the ultranitrosulfophosphoric acid process, the combination of the two compounds cooperates in the elimination of citrate insoluble acid components.

The high $P_2O_5$ values of the ultranitrophosphoric acid product and of the ultranitrosulfophosphoric acid product may possibly be accounted for by the presence of known or unknown high phosphorus content compounds having values greater than 100 percent expressed as $P_2O_5$ equivalent on an impurity-free basis. In a process employing a pool of phosphoric acid subjected to submerged gas heating, a quench reaction apparently takes place wherein $P_2O_3$, $P_4O$, or other lower oxides of phosphorus are formed in the contact zone of hot gas and liquid acids. In turn, these species of phosphorus are chemically reactive at the temperatures employed in this process and may modify any metaphosphoric acid, tri- or tetrapolyphosphoric acid, or other phosphoruc compounds, to yield our very high analysis ultraphosphoric acids. The presence of condensed molecules derived from $P_4O$, or other like species with a high analysis in excess of 125 percent $P_2O_5$ equivalent, would thus substantially increase the $P_2O_5$ content of acids in which they are present.

A primary object of the present invention is to provide new compounds or compositions having unusual properties as described above and hereinafter. A further object is to provide a process for converting wet process phosphoric acid material into high $P_2O_5$ equivalent phosphoric acids with a substantial reduction of citrate insoluble components and while producing improved color in the product. A still further object is to provide novel means and process steps for improving the manufacture of phosphoric acids. Other specific objects and advantages will appear as the specification proceeds.

The invention is shown, in an illustrative embodiment, by the accompanying drawing, showing a side view in elevation, and partly in section, of apparatus illustrating our invention and in which the products described herein may be formed.

In the preparation of our ultranitrophosphoric acids, we add nitric acid to wet process phosphoric acid and supply the combined acids to an evaporator to provide a pool therein. The acid pool is maintained at a desired temperature by submerged gas heating, the gaseous products of combustion being directed into the pool and the volume of the combustion gas being maintained at a substantially constant level. The temperature of the pool of acid is maintained at a selected temperature, plus or minus a few degrees, within a range of about 450° F. to about 650° F. The process yields acid products of about 78 to 100 weight percent $P_2O_5$ equivalent on an impurity-free basis, the acid products being liquid at room or ambient temperatures.

In the preparation of the ultranitrosulfophosphoric acids, the process conditions are the same except that $SO_3$ is added along with the nitric acid to the feed phosphoric acids. The $SO_3$ is preferably added as $H_2SO_4$, but since the acid mixture is subjected to dehydration and since phosphoric acid, which is produced by treatment of phosphate rock with $H_2SO_4$, normally contains a small amount of $SO_3$, the sulphur group can be expressed as added or excess $SO_3$, or, alternatively, as total $SO_3$. We have discovered that the addition of relatively small amounts of $SO_3$ to the wet process acid, which is then subjected to high temperature quench reactions as described hereinafter, causes at least some of the $SO_3$ to enter into the ultraphosphoric acid lattice to form the new compounds which we have referred to as ultranitrosulfophosphoric acids. The ultranitrosulfophosphoric acids are unique in that the reacted sulphur group ($SO_3$) is bound and does not react with ammonia or respond to ammoniation. Attempts to ammoniate the sulphur group in the ultranitrosulfophosphoric acid compositions have been unsuccessful; while the phosphorus group ammoniates stoichiometrically, the sulphur group is not ammoniated at all.

The product produced by the addition of nitric acid and without the added or excess $SO_3$ has a tan to greenish-tan color. When the additional $SO_3$ is added, as in the preparation of the ultranitrosulfophosphoric acid, the phosphoric acid product becomes green.

The process conditions, which will now be described, are the same whether employed for the preparation of ultranitrophosphoric acids or for the preparation of ultranitrosulfophosphoric acids:

The acid starting material which is fed to the pool may be any phosphoric acid of commerce, but preferably is wet process phosphoric acid. Such acid usually has a metal oxide content of from 1% to 10%, but sometimes the metal impurities are as high as 15% or higher. The feed acid is concentrated in the pool and allowed to overflow into a receiver vessel. The desired pool temperature may be maintained by regulating the feed rate of the fresh acid into the pool. Heat is supplied by a stream of hot gases resulting from the combustion of air and fuel, such as propane or other gaseous or liquid fuels. The combustion gases may be tempered with outside air to bring the temperature of the gases discharged into the pool of acid to about 1500–1900° F. The gases fed to the evaporator are maintained at a constant rate irrespective of back pressures created in the evaporator, utilizing a combination of instruments or devices which will be described in greater detail hereinafter.

By providing a system in which the acids are retained in the evaporator a relatively short time, we find that we can produce uniform ultraphosphoric acids in which the undesirable meta form is held to a low level and which contains about 78–100 weight percent $P_2O_5$ equivalent on an impurity-free basis.

By way of specific illustration, wet process phosphoric acid, which may be of the range 27 to 64 weight percent phosphorus calculated as $P_2O_5$ equivalent and to which nitric acid or nitric acid and sulphuric acid have been added, is pumped from feed tank 10, as shown in the drawing, through pipe 10a to evaporator 11, forming a pool in the frusto-conical portion of the evaporator 11.

The hot combustion gases are directed through the dip pipe 12 to the lower portion of the reaction chamber where they are discharged from the lower inclined opening of the dip pipe. The gases discharged from the dip pipe proceed toward the bottom and an inclined wall of the frusto-conical portion. Here the swiftly moving stream of hot gases engages the liquid acids in the pool at the bottom of the evaporator and while in intimate mixture with the acids carry them upwards in a state of turbulence within the reaction chamber. The moisture-laden gases which disengage from the acid in the space above the evaporator bottom are removed by duct 13 to separator 14. Entrained acid droplets removed in the separator 14 are returned to receiver 21, and the gases continue on to the floating-bed scrubber 15, where condensable and water-soluble pollutants are removed.

The temperature of the liquid acids within the reaction chamber is maintained at a substantially constant value by a control circuit. The filled bulb 16 communicates with the penumatic transmitter 17 through conduit 16a, and the pressure transmitter 17 communicates similarly through conduit 17a with the recorder-controller 18 which is pre-set to the desired temperature and which pneumatically operates through conduit 18a the diaphragm control valve 19 in the feed acid line 10a. In operation, the filled bulb 16 senses the acid temperature and records the same by means of transmitter 17 with recorder-controller 18 which is pre-set to the desired temperature, the signal from the bulb to the transmitter being by pressure through the gas-filled conduit 16a. The recorder-controller in operation adjusts the diaphragm control valve 19 so as to increase or decrease the amount of feed as required to maintain the set or predetermined temperature. The effect of this system is to decrease the feed rate with increasing water content of the feed acid, and to increase the feed rate when the water content of the acid decreases.

The dehydrated acid product is removed from the evaporator 11 through liquid overflow line 20, which is cooled by a water jacket 20a, to the receiving tank 21 which is provided with a cooling jacket 21a. From the receiver 21 the product is passed by pump 22 to the product tank 23.

In the operation of the scrubber 15 in the processes for producing our nitro and nitrosulfo products, we prefer to employ ammonium hydroxide rather than water in order to make a recovery of the nitrogen material.

A fuel gas, such as propane, is passed from fuel tank 24 through conduit 25 to the vortex burner 26 where it is mixed with air (preferably an excess of air) from blower 27. Combustion takes place within the chamber 28, and the combustion gases are delivered through the dip pipe 12, as heretofore described. Overflow pipe 20 is located at a point on the evaporator which is generally in line with the top of the liquid pool and which is opposite the inclined wall toward which the hot gases are directed.

A substantially constant rate of fuel gas input is maintained, irrespective of fluctuations in back pressure, by the following combination of control elements. A differential pressure meter 29 has a diaphragm 29a. Pressure conduits 29b and 29c lead to tapped openings communicating with the interior of the conduit 25 on opposite sides of a flow element 30 which is equipped with a disk or plate 30a providing a sharp-edged flow orifice. The conduits 29b and 29c are connected across the diaphragm 29a of the differential pressure meter 29 which measures the flow incident through flow element 30. The gas flows through the element 30 and is reduced in pressure by the balanced regulator 31, for example, to about 30" water column. The differential pressure result is transmitted by element 29 to the recorder-controller 32 through penumatic tube 32a. The controller 32 is provided with a control member which is pre-set to a selected pressure and therefore it responds to changes in flow of the fuel gas through flow element 30. For example, if there is an increased back pressure in the evaporator dip pipe, such increase is sensed by the conduit 23b at one side of the orifice plate 30a, and such increase of pressure is transmitted through the transmitter 29 to the controller 32, which pressure, being above that to which the recorder 32 is set, causes the recorder to move the diaphragm control valve 33 toward open position. Similarly, with a decrease in back pressure, the recorder-controller 32 moves the diaphragm-controlled valve 33 a proportional distance toward closed position.

The $SO_3$ is added to the phosphoric acid preferably in the form of $H_2SO_4$. The addition of $SO_3$ to the phosphoric acid may be varied in amount depending upon the amount of $SO_3$ already present in the acid feed, the volume of the pool of acid subjected to dehydration, etc. Wet process phosphoric acid normally contains about 2.5–4% of $SO_3$, the average being about 3.5%. We add additional $SO_3$ to bring the total $SO_3$ content of the acid undergoing treatment to about 6–11%. Under some conditions, the total $SO_3$ might be slightly reduced to about 5.5% and the percentage of the $SO_3$ increased above 11%, but we prefer to have the total $SO_3$ content in the range of about 7–11%.

In the operation of our process for producing ultra-nitrophosphoric acids or ultranitrosulfophosphoric acids, it is important that certain features of the process be taken into account. Referring to the drawing, the hot gases proceeding into the reaction chamber through tube 12 move quickly to near the bottom of the frusto-conical lower portion of the reaction chamber, there entering the liquid pool. From the bottom of this chamber, the very hot gases moving together with portions of the liquid pool are passed upwardly guided by the frusto-conical surface of the lower portion of the chamber and move about within the chamber in intimate contact with the liquid acids, thus to provide effective heat transfer.

We believe that the reaction of dehydration takes place especially fast where small droplets or portions of liquid are in direct contact with the hot gas, and that upon reaction, the product so formed may then come into contact with larger bodies of liquid so as to be quenched and brought back to the temperature of the liquid body. As the reaction takes place and the reaction products reach the outlet 20, these products pass off from the reaction chamber and are quickly cooled. The reaction is rapid and violent, and it is important that reaction products be quickly removed after being formed.

To provide for quick removal of the dehydrated acids from the reaction zone, the rate of introduction of feed acids should be related to the volume of the acids within the reaction zone so that the acids will be passed through the reaction chamber in a certain minimum time. We find it important to use an acid feed rate in volume per minute which is at least $\frac{1}{12}$ of the volume of the liquid within the reaction chamber and preferably at least $\frac{1}{8}$ of the liquid volume within the reaction chamber (the volume in each case should, of course, be counted in the same units). To provide a range, we recommend that the ratio between volume per minute of feed and volume of liquid within the reaction zone be from $\frac{1}{2}$ to $\frac{1}{12}$. From the foregoing, it will be seen that with a contemplated feed rate of 4 gallons of wet process phosphoric acid per minute, the reaction chamber should be designed so as to contain from 8 to 48 gallons of acids, which would provide an average retention time of the acids within the reaction chamber of 2 to 12 minutes.

By way of specific example, in a structure such as is is shown in the drawing, a liquid pool having a volume of 10 gallons may be maintained by the frusto-conical portion of the evaporator in which the cone is 10 inches high, with a diameter of 23 inches at the top of the cone and with the liquid draw-off pipe 20 at a point 10 inches above the flow bottom of the evaporator.

We find that the addition of $SO_3$ to the wet process acid feed, as described above, provides a greater latitude with respect to the retention time of the acid within the reaction chamber, as will be illustrated by examples set out hereinafter and in which the evaporation is carried on in a reaction chamber having a volume of 15 gallons. In such an arrangement, we find that the acid feed rate in volume per minute may be from $\frac{1}{2}$ of the volume of the liquid within the reaction chamber to $\frac{1}{15}$ of such volume, and the average retention time of the acids within the reaction chamber may be from 2 to 15 minutes. Even with such an arrangement, however, we prefer to provide an average retention time of 10 minutes or less.

The temperature attained by the liquid acids through contact with the hot gaseous products of combustion should preferably be the boiling point of the acid in the desired product composition which has the lowest boiling point. For example, if it is desired to produce a composition having a concentration of 100 weight percent phosphorous calculated as $P_2O_5$ equivalent on an impurity-free basis from a commercial wet process phosphoric acid containing about 1.5 percent of metal salts, the feed acid should be brought to a temperature of about 600° F., which is the boiling point of such composition.

While the preferred range of pool temperatures is from 450 to 650° F., higher temperatures up to 1000° F. may be employed, particularly where a liquid product is not required.

The hot gases are introduced into the reaction chamber at such a rate that the heat given off by them to the liquid acid is sufficient to raise the acids within the reaction chamber to the temperature which is selected in accordance with the principles outlined above. This rate is maintained by the automatic devices already described. By controlling the flow of fuel gas at a uniform rate, the heat input is thus maintained at a uniform rate and therefore the acids are heated uniformly even though there be temporary clogging or stoppage of the inlet pipe or of the discharge opening of the pipe. The design of this pipe should be such as to provide an adequate internal cross section so that at the desired rate of gas flow, the velocity of the gas issuing from this pipe will not be so great as to blow the liquid acids from the entire bottom portion of the chamber and thus destroy the liquid pool.

In the design illustrated in the drawing, the median pool cross-sectional area (226.9 sq. in.) bears with the cross-sectional area of the dip pipe (28.3 sq. in.) the ratio of 8 to 1. We prefer that the median pool cross-sectional area should bear a ratio to the cross-sectional area of the dip pipe of at least 5.5 to 1. We find that if ratios are maintained within the range specified above, combustion gas velocity rates are possible which are sufficiently high for the necessary heat transfer, yet are low enough to preclude the blowing dry of the liquid pool.

Another feature of the embodiment of our invention illustrated in the drawing is that the outlet 20 for withdrawing product from the reaction chamber is opposite the inclined surface toward which the inclined opening of the dip pipe is directed so that the greater turbulence of liquid and gases is on one side of the chamber and there is less likelihood that such turbulence will affect the pool near the point where product is withdrawn.

As indicated in the drawing, the sulphuric acid may be stored in tank 34 and withdrawn by pump 35 and discharged through a metering device 36 into the phosphoric acid feed tank 10. Similarly, the nitric acid ($HNO_3$) may be discharged through a metering device into the tank 10. If desired, the nitric acid may be added either to the feed tank 10 or injected simultaneously with the feed at the feed inlet to the evaporator 11.

The ultranitrosulfophosphoric acid or ultranitrosulfophosphoric acid may be defined in terms of $P_2O_5$ equivalent either on an analyses basis or on an impurity-free (calculated) basis. In actual phosphoric acid practice, the products are analyzed on a 100% sample basis employing a standard procedure in which ammonium phosphate molybdate is made from the phosphorus sample and a volumetric determination of the phosphate $P_2O_5$ values made by titration. Such a standard procedure yields a phosphoric acid product which is of lower numerical value than the corresponding calculated $P_2O_5$ value of the product "on an impurity-free basis."

By way of illustration, assuming that by the analysis method the ultranitrophosphoric acid has a value of 77 weight percent $P_2O_5$, and that it contains 8% of impurities, including $SO_3$ metal oxides, etc., the conversion is made by subtracting the 8% from 100 and a decimal is placed ahead of the figure 92. 77 is then divided by 0.92, giving a figure of 84% $P_2O_5$ equivalent value on an impurity-free basis. The following are illustrative:

| Analysis, Percent | Impurity-Free Basis, Percent | Conversion of Polyphosphoric Acids, Percent |
|---|---|---|
| 69 | 93 | 67 |
| 77 | 84 | 82 |
| 79 | 88 | 90 |
| 81 | 92 | 95 |

To illustrate, we may prepare our special nitrophosphoric acids having about 78 to 100 weight percent $P_2O_5$ equivalent on an impurity free basis and having about 69 to 82 weight percent $P_2O_5$ equivalent based on the total weight of the acids. Further, by adding $SO_3$ to the feed in our dehydration procedure we may prepare the special nitrosulfophosphoric acids of similar $P_2O_5$ percentage content as above expressed and containing $SO_3$ in the amount of 0.8 to 20 weight percent, preferably 3.5 percent or less.

The ultranitrophosphoric acid is a liquid product having a tan to greenish-tan color, is low in citrate insoluble material (containing 1% to about 5% citrate insolubles), and is substantially free of organic material.

The ultranitrosulfophosphoric acids have a light green color and have a similar low content of citrate insolubles. The $SO_3$ content in the final product may be from 1 to 20% in cases where the total $P_2O_5$ is relatively low. Where, however, the total $P_2O_5$ is relatively high and in the range of 83–100 weight percent on an impurity-free basis, the $SO_3$ content is in the range of 0.8–3.5%. In the upper portion of this range of $P_2O_5$ values, the $SO_3$ reaches a plateau in the range of about 1–1.5 weight percent, and it is indicated that in such ranges the $SO_3$ is bound in the molecule of the product.

The specific gravity of the ultranitrophosphoric acid product and the ultranitrosulfophosphoric acid product is about 2.2 and represents an increase of over 10% above the specific gravity of superphosphoric acids. Wet process phosphoric acid of 54% weight percent on an impurity-free basis has a specific gravity of about 1.72–1.75. Superphosphoric acid having about 72–80 weight percent of $P_2O_5$ equivalent on an impurity-free basis has a specific gravity of about 2.0. Our ultranitrophosphoric acid and ultranitrosulfophosphoric acid has a specific gravity in the range of 2.1–2.2 and generally about 2.2, thus representing an increase of over 10% compared with the specific gravity of superphosphoric acid. By way of example, a gallon of the 54 weight percent acid would contain 7.65 lbs. of $P_2O_5$, and a gallon of the superphosphoric acid would contain 12.1 lbs. of $P_2O_5$. In contrast, our ultranitrophosphoric acid product and ultranitrosulfophosphoric product will contain 14.5 lbs. of $P_2O_5$.

Specific detailed examples illustrative of the processes may be set out as follows:

*Example I*

To wet process phosphoric acid containing 3.5% $SO_3$ was added nitric acid to provide 0.6 N in the acid feed. The combined acids were fed to the evaporator as illustrated in the drawing, the feed having the following composition:

| | Percent |
|---|---|
| $P_2O_5$ | 54.5 |
| F | 1.0 |
| $SO_3$ | 3.5 |
| $Al_2O_3$ | 1.5 |
| $Fe_2O_3$ | 1.5 |
| CaO | 0.07 |
| MgO | 1.0 |

Hot gases produced in the combustion chamber (using propane and air) were admitted to the evaporator at the temperature of 1750° F. and directed under the surface of the acid. The acid pool was maintained at a temperature of 670° F. ±2° F. Feed acid of the above composition was admitted at a rate of 1.7 gallons per minute. The evolved gases, after removal of the entrained acid droplets, continued to the scrubber, where they contacted ammonium hydroxide for the removal of nitrogen components, condensables, and pollutants. The effluent gases issued from the stack of the floating-bed scrubber at a substantially nil content of fluorine and $SO_2$ and with most of the $NO_2$. The product had the following composition:

| | Percent |
|---|---|
| Total $P_2O_5$ | 84 |
| Ortho | 13.4 |
| Fluorine | 0.2 |
| $Al_2O_3$ | 1.2 |
| $Fe_2O_3$ | 1.5 |
| CaO | 0.07 |
| MgO | 2.5 |
| Color, beige. | |

In the final product, there was about 0.5 $SO_3$ and a trace (0.02%) of nitrogen. The product contained 5.7% solids, 5.1% citrate insolubles, and the specific gravity was 2.06. The conversion of the ortho to polyphosphoric acid was 83%. The average retention time of the product in the acid pool was 6 minutes.

The control means for maintaining the temperature within a few degrees of the selected temperature was as follows:

Propane gas was admitted through a conduit at about 30 p.s.i.g. The combination of control elements was as shown in the drawing. The gas flowed through the orifice of plate 30a and was reduced in pressure by the balanced regulator 31 to 30" water column. The pressure taps around the flow plate 30a were connected across the diaphragm 29a of the differential pressure meter 29 (Foxboro Type 15A d./p. Cell Transmitter) for the purpose of measuring the flow incident through the element 30. The pressure differential result was communicated through the pneumatic pipe 32a to the recorder-controller 32, which was a series "500" proportional air-operated free-vane controller, Bristol Company instrument bulletin A1420. The control of the recorder-controller was set to respond to changes in flow of the propane gas through flow element 30. As the flow of gas varies, due to changing back pressure in the evaporator, a pneumatic signal is transmitted from controller 32 to the diaphragm control valve 33, which opens in response to an increase in back pressure, and which closes with a decrease in back pressure. This control provided a substantially constant volume of fuel gas throughout the operation. Air was supplied by blower 23 in excess of the amount needed for combustion. The combustion occurred in chamber 28, and gaseous products of combustion were discharged through pipe 12 into the pool of acid below the surface of the pool.

The temperature of the combustion gases discharged into the pool of acid was about 1750° F. With a constant heat input, it was necessary to control the input of feed acid so as to maintain a constant acid pool temperature or its corollary product composition. A filled bulb 16 in the acid pool transmitted the temperature result by pressure through a gas-filled conduit upon the pneumatic transmitter 17 which transmitted the result to recorder-controller 18. The pressure transmitter was Taylor Instrument Company Model 339R, and the recorder-transmitter was Taylor Instrument Company Fulscope Controller, the latter instrument being set for a predetermined acid pool temperature and it operated the diaphragm control valve 19 to decrease the feed rate when the feed acid had a high water content and to increase the feed rate proportionally as the water content of the acid decreased. A uniform pool temperature was obtained, plus or minus 2° F.

*Example II*

The process was carried out as described in Example I, using the same temperature control means and other procedure, except that $SO_3$ was also added to the feed along with nitric acid.

The feed composition was as follows:

| | Percent |
|---|---|
| $P_2O_5$ | 51 |
| Flourine | 1 |
| $Al_2O_3$ | 1.5 |
| $Fe_2O_3$ | 1.5 |
| CaO | 0.1 |
| MgO | 1.0 |
| $SO_3$ | [1] 10.2 |
| N | 0.5 |

The operation was carried out as described in Example I except that the temperature of the acid pool was maintained at 650° F., the feed rate was 1.3 gallons per minute, and the average retention time in the acid pool was 7.7 minutes. The product had the following composition:

| | Percent |
|---|---|
| $P_2O_5$ | 85.0 |
| F | 0.2 |
| $Al_2O_3$ | 1.7 |
| $Fe_2O_3$ | 1.8 |
| CaO | 0.1 |
| MgO | 0.7 |

The final product contained a trace (0.02%) of nitrogen, 2.7% $SO_3$, 8.5% solids, and 1.6% citrate insolubles. The product was liquid, light green in color, and had a specific gravity of 2.1%.

A series of runs designated as A, B, C, D, E, F and G in Table I, were carried out on feed substantially the same as that in Example I and under the conditions described in Example I except as indicated in Table I. The feed rates are indicated in gallons per minute. The feed contained about 5% $SO_3$ in all of the runs except run D, where added $SO_3$ brought the content to 9.5 weight percent (for producing ultranitrosulfophosphoric acid). The table indicates the percent of N in the feed and the remainder of the data applies to the product obtained.

TABLE I

| | A | B | C | D | E | F | G |
|---|---|---|---|---|---|---|---|
| Percent $P_2O_5$ of product | 82.0 | 81.0 | 80.0 | 92.0 | 79.0 | 81.0 | 80.0 |
| Percent N in feed | 0.2 | 0.5 | 0.7 | 0.7 | 0.7 | 0.3 | 0.5 |
| Percent F in product | 0.1 | 0.1 | 0.1 | 0.1 | 0.3 | 0.2 | 0.2 |
| Percent $Al_2O_3$ in product | 1.7 | 1.7 | 1.5 | 1.8 | 1.7 | 1.8 | 1.5 |
| Percent $Fe_2O_3$ in product | 1.7 | 1.8 | 1.8 | 1.5 | 1.7 | 1.7 | 1.8 |
| Percent CaO in product | 0.1 | 0.1 | 0.1 | 0.1 | 0.1 | 0.1 | 0.1 |
| Percent MgO in product | 0.6 | 0.6 | 0.6 | 0.6 | 0.6 | 0.6 | 0.6 |
| Solids in product | 8.5 | 6.6 | 7.5 | 9.5 | 0.5 | 2.8 | 3.7 |
| Specific gravity | 2.20 | 2.20 | 2.15 | 2.18 | 2.10 | 2.13 | 2.15 |
| Combustion gas (° F.) | 1,850 | 1,850 | 1,975 | 2,000 | 1,860 | 1,890 | 1,830 |
| Acid pool temp. (° F.) | 610 | 610 | 610 | 580 | 530 | 670 | 680 |
| Acid pool volume (gal.) | 10 | 10 | 10 | 10 | 10 | 13 | 13 |
| Acid feed rate (g.p.m.) | 2.0 | 2.0 | 2.0 | 2.0 | 2.0 | 1.7 | 1.5 |
| Retention time (min.) | 5 | 5 | 5 | 5 | 5 | 7.7 | 8.7 |
| Product rate (g.p.m.) | 1.1 | 1.1 | 1.1 | 1.1 | 1.3 | 1.0 | 0.9 |
| Product receiver (° F.) | 450 | 450 | 450 | 450 | 450 | 450 | 450 |
| Effluent gas temp. (° F.) | 680 | 680 | 680 | 650 | 600 | 740 | 750 |
| Percent conversion to polyphosphoric acid | 82 | 81 | 75 | 81 | 74 | 76 | 80 |
| Percent ortho in product | 14.3 | 14.2 | 19.0 | 16.4 | 19.1 | 18.3 | 15.1 |
| Percent $SO_3$ in product | 0.82 | 0.9 | 1.3 | 3.3 | 1.9 | 1.0 | 1.5 |

While in the foregoing specification we have set out specific embodiments of the invention in considerable detail for the purpose of illustrating the invention, it will be understood that such detail or details may be varied widely by those skilled in the art without departing from the spirit and scope of our invention.

We claim:

1. In a process for preparing wet process nitrophosphoric acid, the steps of adding nitric acid to wet process orthophosphoric acid to bring the nitrogen content thereof to 0.2–0.8 percent, and dehydrating the combined acids to 78–100 weight percent $P_2O_5$ equivalent on an impurity-free basis by heating to a temperature of about 450–650° F.

2. As a new composition of matter, the reaction product of wet process phosphoric acid, containing 1–15 percent metal oxides, with nitric acid, the product having from about 78–100 weight percent $P_2O_5$ equivalent on an impurity-free basis and having more than 70 percent of its orthophosphoric acid content converted to polyphosphoric acid and prepared by the process of claim 1.

3. The product of claim 2 in which more than 80 percent of the orthophosphoric acid has been converted to polyphosphoric acid.

4. In a process for preparing wet process nitrosulfophosphoric acid, the steps of heating wet process phosphoric acid containing 0.2–0.8 percent nitrogen and in excess of 6 percent $SO_3$ by heating to a temperature of about 450–650° F. until said acid is dehydrated to a phosphoric ---
[1] (6.7% additional $SO_3$ added.)

acid content in excess of 78 weight percent calculated as $P_2O_5$ equivalent on an impurity-free basis.

5. As a new composition of matter, the reaction product of wet process phosphoric acid, containing 1–15 percent of metal oxides, with nitric acid and sulfuric acid, the product having about 78–100 weight percent $P_2O_5$ equivalent on an impurity-free basis and prepared by the process of claim 4.

6. A process for preparing nitrosulfophosphoric acid, the steps of adding $SO_3$ to bring the $SO_3$ content of the wet process phosphoric acid to at least 5.5 weight percent, adding nitric acid to bring the nitrogen content of the phosphoric acid to about 0.2–0.8 percent, and passing a stream of hot gases into contact with said gases in a reaction chamber to bring said acids to a temperature of about 450–650° F. and until said phosphoric acid is in excess of 78 weight percent $P_2O_5$ equivalent on an impurity-free basis.

7. In a process for preparing nitrosulfophosphoric acid, the steps of maintaining a pool of wet process phosphoric acid containing 1–15 percent of metal salts, adding fresh $SO_3$ to bring the $SO_3$ content of the phosphoric acid to at least 6 weight percent, adding nitric acid to bring the nitrogen content of the phosphoric acid to about 0.2–0.8 weight percent, directing gaseous products of combustion into said pool to heat the acids therein, removing the evolved water vapor, continuing to feed said mixed acids into said pool, and withdrawing the product therefrom at rates to maintain a pool temperature within the range of about 450–650° F. to maintain an average retention time of the acids in said pool of about 3–12 minutes.

References Cited

UNITED STATES PATENTS

| | | | |
|---|---|---|---|
| 2,901,340 | 8/1959 | Semel et al. | 23—139 X |
| 3,030,200 | 4/1962 | Harris | 23—139 X |
| 3,104,947 | 9/1963 | Switzer et al. | 23—165 |
| 3,192,013 | 6/1965 | Young | 23—165 |

OTHER REFERENCES

Van Wazer, Phosphorus and Its Compounds, vol. 1, Interscience Publishers Inc., New York, 1958, pp. 708, 770–775.

OSCAR R. VERTIZ, *Primary Examiner.*

H. T. CARTER, *Assistant Examiner.*

UNITED STATES PATENT OFFICE
CERTIFICATE OF CORRECTION

Patent No. 3,333,922                                                   August 1, 1967

Ernest Csendes et al.

It is hereby certified that error appears in the above numbered patent requiring correction and that the said Letters Patent should read as corrected below.

Column 2, line 69, for "phosphoruc" read -- phosphorus --; column 10, line 12, for "8.5%" read -- 2.5% --.

Signed and sealed this 18th day of June 1968.

(SEAL)
Attest:

Edward M. Fletcher, Jr.                                       EDWARD J. BRENNER
Attesting Officer                                                        Commissioner of Patents

UNITED STATES PATENT OFFICE
CERTIFICATE OF CORRECTION

Patent No. 3,333,922     August 1, 1967

Ernest Csendes et al.

It is certified that error appears in the above identified patent and that said Letters Patent are hereby corrected as shown below:

Column 11, line 14, "stream of hot acids into contact with said gases" should read -- stream of hot gases into contact with said acids --.

Signed and sealed this 26th day of August 1969.

(SEAL)

Attest:

Edward M. Fletcher, Jr.

Attesting Officer

WILLIAM E. SCHUYLER, JR.

Commissioner of Patents